(12) United States Patent
Fransen (10) Patent No.: US 6,213,051 B1
(45) Date of Patent: Apr. 10, 2001

(54) IMPLEMENT FOR AUTOMATICALLY MILKING ANIMALS

(75) Inventor: René Fransen, Vlaardingen (NL)

(73) Assignee: Maasland N.V. (NL)

( * ) Notice: Subject to any disclaimer, the term of this patent is extended or adjusted under 35 U.S.C. 154(b) by 0 days.

(21) Appl. No.: 09/043,992

(22) Filed: Mar. 30, 1998

Related U.S. Application Data (63) Continuation of application No. PCT/NL97/00432, filed on Jul. 21, 1997.

(30) Foreign Application Priority Data

Aug. 1, 1996 (EP) .................................................. 96202174

(51) Int. Cl.$^7$ ................................ H01J 3/00; H01J 5/00
(52) U.S. Cl. .................................... 119/14.08; 119/14.01
(58) Field of Search ............................... 119/14.08, 14.01, 119/14.02, 14.03, 14.14

(56) References Cited

U.S. PATENT DOCUMENTS

| | | | |
|---|---|---|---|
| 4,867,103 | * 9/1989 | Montalescot et al. | 119/41.08 |
| 4,936,255 | * 6/1990 | Pera | 119/14.08 |
| 5,069,160 | * 12/1991 | Street et al. | 119/14.08 |
| 5,275,124 | * 1/1994 | Van Der Lely et al. | 119/41.08 |
| 5,379,721 | * 1/1995 | Dessing et al. | 119/41.08 |
| 5,697,324 | * 12/1997 | Van Der Lely | 119/41.08 |
| 5,718,186 | * 2/1998 | Van Der Lely | 119/41.08 |
| 5,762,020 | * 6/1998 | Van Der Lely | 119/41.08 |
| 5,784,994 | * 7/1998 | Van Der Lely | 119/41.08 |
| 5,842,436 | * 12/1998 | Van Der Lely | 119/41.08 |
| 5,909,716 | * 6/1999 | Van Der Lely | 119/41.08 |

* cited by examiner

*Primary Examiner*—Peter M. Poon
*Assistant Examiner*—Judith A. Nelson
(74) *Attorney, Agent, or Firm*—Penrose Lucas Albright (57) ABSTRACT

An apparatus for automatically milking animals, is provided with a milking robot which includes a robot arm that carries teat cups, each teat cup being carried in its own housing in a supporting element in the robot arm. When the teat cups are in an inoperative position, the openings on their upper sides are shielded by the supporting element. Each robot arm portion comprises a plurality of housings, one for each teat cup. Piston and cylinder members are disposed in each housing to move the teat cups from their shielded inoperative position to an open operative position under the teats of the animal to be milked and then upwardly to connect the teat cups to the teats of the animal to be milked. Thereafter the supporting element is lowered and the teat cups which remain on the teats are connected thereto only by flexible members. When the milking of each udder quarter is about completed, each teat cup is pulled against a shoe disposed to receive it in its individual housing by a piston and cylinder device in the housing. Placement of the teat cups on the animal's teats is controlled by a computer guided by two cameras mounted on the supporting element which are pointed towards the animal's teats in different angular directions and which include at least one infrared sensitive camera.

28 Claims, 8 Drawing Sheets

FIG.13 ly, seen in the direction of the arrows V in FIG.

IMPLEMENT FOR AUTOMATICALLY MILKING ANIMALS

RELATED APPLICATION

This is a Continuation Application of PCT Application Ser. No. PCT/NL97/00432, filed Jul. 21, 1997.

FIELD OF THE INVENTION:

The present invention relates to an apparatus and method for automatically milking animals, such as cows, provided with a milking robot including a robot arm which is adapted to carry teat cups.

SUMMARY OF THE INVENTION:

While the teat cups are not connected to the teats of an animal to be milked, the teat cups are carried by the robot arm and are located on or against the end of the robot arm, with the opening for the teats being directed upwards. In this manner, impurities may easily get into the teat space of the teat cups. To obviate this drawback, at least to a considerable extent, in accordance with the invention, the apparatus is characterized in that, in the position of rest of the teat cups on the robot arm, at least the open upper sides of the teat cups are shielded by a robot arm portion. In order for the teat cups to be individually connected to the teats, the robot arm comprises a supporting element, which is pivotable or shiftable or both under the udder of an animal to be milked and in which the teat cups, each in its own housing, are movably disposed. The housing of a teat cup is preferably hinge-connected to the supporting element. Said supporting element is then capable of constituting at the same time the shield means for at least the open upper sides of the teat cups when the latter are in the position of rest.

In a first embodiment, the housing of a teat cup is provided with a carrying shoe for the teat cup, whic h ca rry ing shoe is hinge-connected to said housing. In this embodiment, an operating piston and cylinder unit may be disposed between the supporting element at one side and the housing of a teat cup and the carrying shoe for the teat cup at the other side. The housing may further b e provided with a stop for the ca rry ing shoe for the teat cup, which carrying shoe is disposed in this housing, while furthermore there is provided a coupling mechanism for adjusting the teat cup, by means of the operating piston and cylinder unit, from the inoperative position into the operative position, in which the upper side of the teat cup is no longer shielded, and subsequently moving the teat c up upwardly.

In a second embodiment, there is provided a carrier that is shiftable in a housing, which carrier is adapted to carry a teat cup. In this embodiment, an operating piston and cylinder element may be disposed between the supporting element and the carrier that is shiftable in a relevant housing. The housing may further be provided with a stop for the carrier that is shiftable therein, in order that, when the carrier has been shifted against said stop by means of a relevant operating piston and cylinder element, the relevan t teat cup is subsequently moved upwardly.

In both embodiments, by means of the relevant operating piston and cylinder components, when a teat cup is connected to the relevant teat, the teat cup is released from the robot arm. Nevertheless, the teat cup can remain connected to the robot arm by means of a flexible element, such as a cord or cable, while in the housing of a teat cup there may be provided a further operating piston and cylinder component for pulling the teat cup back against the robot arm by means of said flexible element.

Additionally, it is possible to pass the milk tube connected to a teat cup over the aforementioned further operating piston and cylinder component and there behind through the housing of the teat cup. Upon withdrawing a teat cup against the robot arm, the milk tube can be moved rearwardly in the relevant housing, so that the risk of kinking of the milk tube is avoided.

In accordance with another aspect of the invention, a detector for determining the position of the teats of an animal to be milked maybe provided on the robot arm, preferably on the supporting element. This detector may comprise two cameras, which are fixedly arranged, though at different angles, or a pivotable camera. In both cases it will be possible to determine accurately the position of the teats in a horizontal plane by means of picture analysis. Inasmuch as the apparatus according to the invention can be operative twenty-four hours a day, it is desirable to produce the detector so that it includes at least one infrared camera. The embodiments of the detector mentioned here, independently of the manner in which the milking robot, in particular as described hereinbefore, is produced, can be applied in any milking robot that is provided with a robot arm construction.

The invention further relates to a method of automatically milking animals, such as cows, by means of a milking robot including a robot arm which is adapted to carry teat cups, characterized in that a teat cup is adjusted from an inoperative position, in which at least the open upper side of the teat cup is shielded by a robot arm portion, into the operative position, in which the upper side of the teat cup is no longer shielded, and is subsequently moved upwards for the purpose of connecting the teat cup to a relevant teat of the animal to be milked. The upward movement of the teat cup can then be realized by moving the housing of this teat cup upwardly in the robot arm. As soon as a teat cup is connected to the relevant teat, the housing of this teat cup can be moved downwardly in the robot arm, while the teat cup remains connected to said housing only by a flexible element, such as a cord or cable. When the housing of the teat cup has been moved downwardly in the robot arm, it is possible, at least in the first embodiment, to adjust the carrying shoe of the teat cup into the position which it takes in the working condition. Subsequently, after the relevant udder quarter has almost been milked out, the teat cup is disconnected and pulled against the relevant carrying shoe by means of the flexible element. Thereafter the teat cup is adjusted into its inoperative position.

For a better understanding of the invention, reference will now be made to the accompanying drawings, in which.

BRIEF DESCRIPTION OF THE DRAWINGS

Corresponding parts in the drawings are designated by the same reference numerals.

DETAILED DESCRIPTION OF THE PREFERRED EMBODIMENTS

Figure 1:
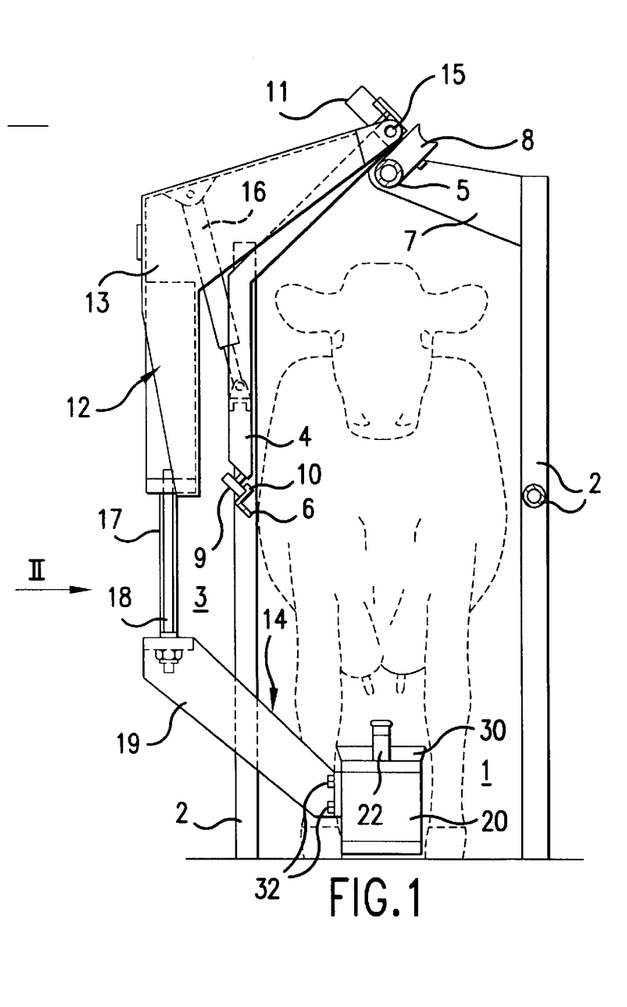
FIG. 1 is a front elevational view which shows a milking robot including a robot arm, in which the construction according to the invention is applied.
Figure 2:
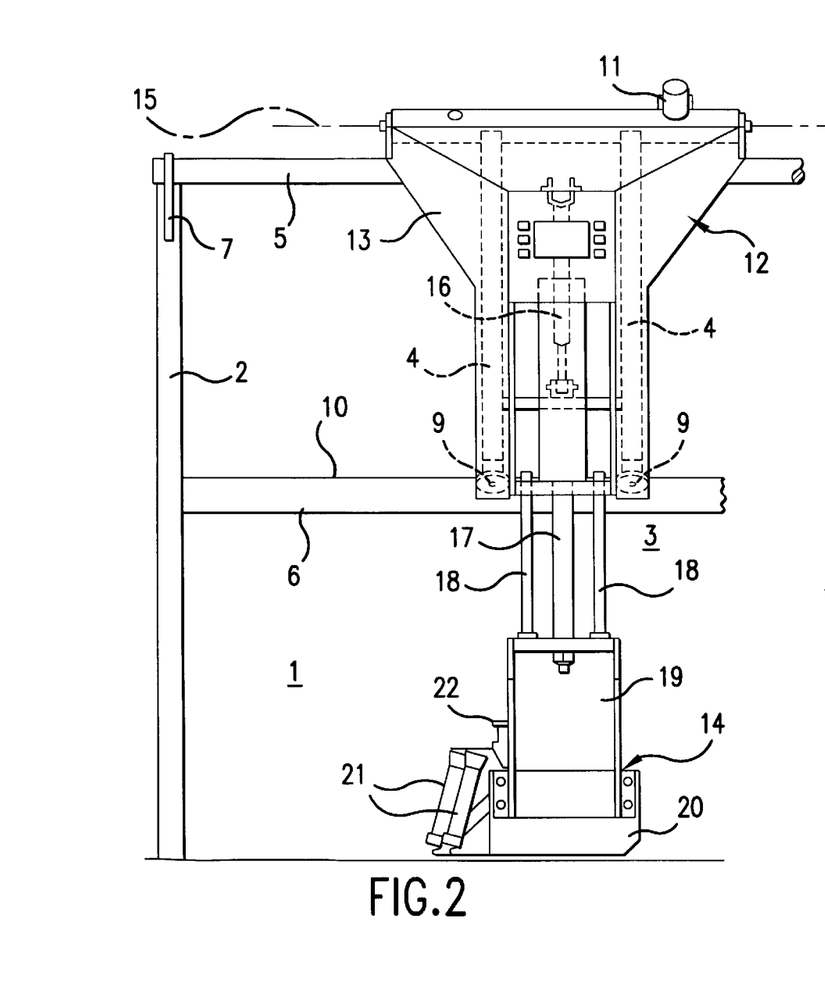
FIG. 2 shows a side elevational view of the milking robot shown in FIG. 1.

The milking compartment 1 shown in FIGS. 1 and 2 is surrounded in a customary manner by a framework 2 and provided with entrance and exit doors. In the milking compartment and in the immediate vicinity thereof, an automatic milking machine is provided which, besides the usual milking equipment, includes a milking robot for automatically connecting teat cups to the teats of an animal to be milked present in the milking compartment, automatically milking said animal and automatically disconnecting the teat cups from its teats. The milking robot comprises a robot arm construction 3 movable in the longitudinal directions of milking compartment 1. Said robot arm construction is provided with a supporting unit 4, which is movable along rails 5 and 6. In the embodiment shown, rail 5 is tubular and disposed in the middle above milking compartment 1 in the longitudinal direction thereof by means of supports 7 attached to framework 2. Rail 6 is disposed approximately half-way the height of the milking compartment at the longitudinal side of framework 2, on the same side where the robot arm construction is located. Rail 6 is constituted by an angle section, the abutment face of which over which supporting unit 4 moves, is located at an angle of approximately 45° obliquely downwardly and outwardly relative to milking compartment 1. Both at its upper side and its under side supporting unit 4 is provided with rollers 8 and 9. Said rollers 8 and 9 are attached to supporting unit 4 perpendicularly to each other and at an angle of approximately 45° relative to a vertical plane in the longitudinal direction of the milking compartment, in such a manner that supporting unit 4 is supported on rail 5 by means of rollers 8 and on rail 6 by means of rollers 9. In order to prevent supporting unit 4 from being displaced from rails 5 and 6, locking means constituted by an upright edge 10 is provided on rail 6. Additional rollers, also attached to supporting unit 4 and arranged diametrically opposite rollers 8 relative to rail 5, rail 5 thus extending between the rollers, may be provided. Supporting unit 4 is capable of being moved along rails 5 and 6 by means of a motor 11.

The robot arm construction is furthermore provided with a sidewardly pivotable portion 12 comprising a carrier 13 extending substantially downwardly and a robot arm 14 attached thereto. Sidewardly pivotable portion 12 and consequently also robot arm 14 are pivotable about a substantial horizontal pivotal axis 15, which is located at the upper side of the milking compartment or near thereto in the longitudinal direction thereof. Pivotal axis 15 and the center line of rail 5 are located in a substantially vertical plane.

The sideward pivotability of portion 12 is achieved by means of an operating piston and cylinder unit 16, which is disposed between said pivotable portion 12 and supporting unit 4. As already mentioned, sidewardly pivotable portion 12 comprises carrier 13 and robot arm 14. Robot arm 14 is connected movably in height to carrier 13 by means of an operating piston and cylinder member 17. Parallel to this operating piston and cylinder member 17 one or more guide rods 18 are provided for counteracting a rotating movement of robot arm 14 about an axis in the longitudinal direction of operating piston and cylinder member 17 relative to carrier 13.

Robot arm 14 comprises a portion 19 extending obliquely downwardly in the direction of the milking compartment and a portion 20 extending horizontally. The latter portion 20, which is adapted to act as a carrier for the teat cups 21, will be described in detail in below. On said portion 20 a detector 22 is mounted for determining the position of the teats.

In order to make it possible for an animal to enter milking compartment 1 without damaging the milking robot, sidewardly pivotable portion 12 of the robot arm construction is pivotable outwardly to such an extent that robot arm 14 is located almost entirely outside milking compartment 1. When an animal is present in the milking compartment and teat cups 21 have to be connected, robot arm construction 3 has first to be moved by means of motor 11 in the longitudinal direction of the milking compartment with robot arm 14 pivoted entirely or almost entirely outside the milking compartment, so that, by means of operating piston and cylinder unit 16, robot arm 14 can be pivoted under the animal into a position in which the detector 22 is capable of determining the position of the teats. By subsequently operating motor 11, piston and cylinder unit 16, and piston and cylinder member 17, it is possible to connect teat cups 21 to the teats of an animal to be milked. When adjusting a teat cup into the correct position for connecting same to a relevant teat, the pivotability of the robot arm 14 about pivotal axis 15 may be of great advantage when the teats of the animal are directed somewhat outwardly; a situation which occurs in particular when relatively much time has elapsed since the previous milking run.

Figure 3:
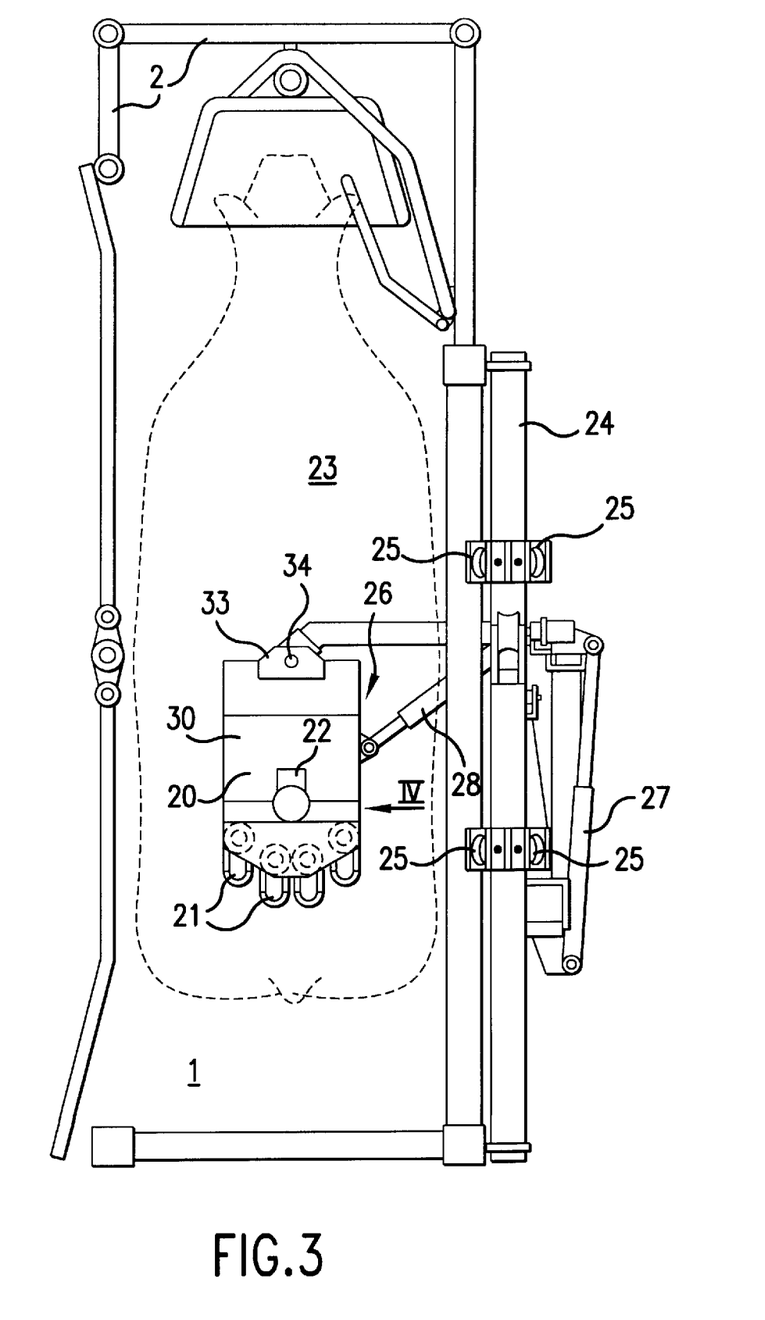
FIG. 3 is a plan view which shows another type of milking robot having a robot arm, in which the construction according to the invention is applied.
Figure 10:
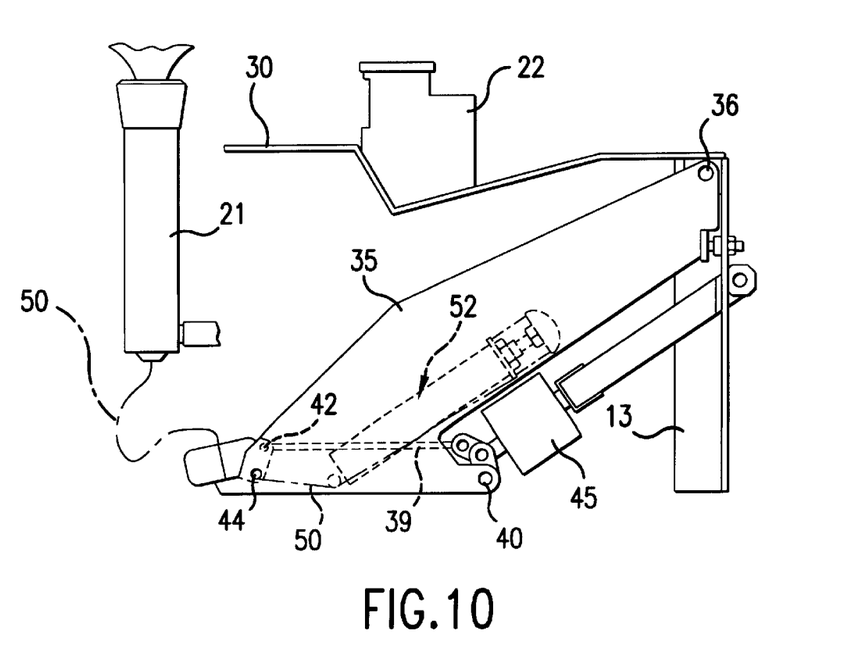
Figure 11:
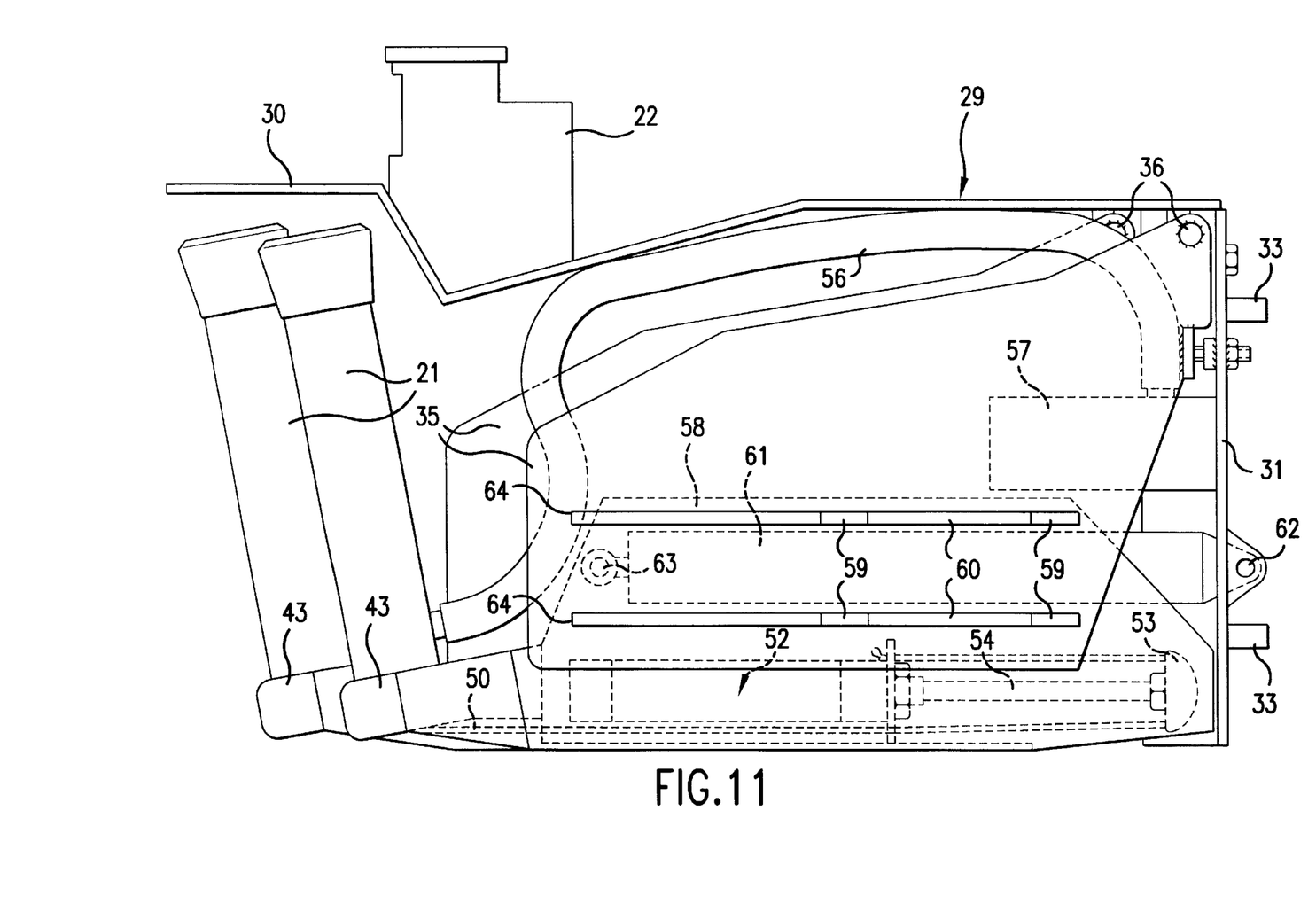
FIG. 11 shows another embodiment of the teat cup carrying a portion of the construction according to the invention, which embodiment can be applied in a milking robot according to FIGS. 1 to 3.
Figure 12:
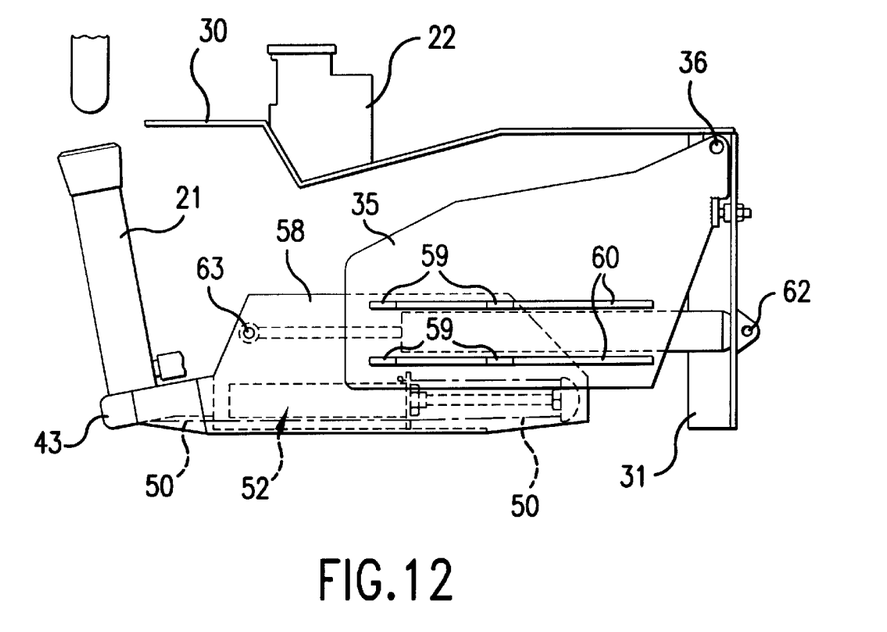
FIGS. 12 and 13 illustrate two positions which may be taken by a housing and a teat cup of the portion of the construction shown in FIG. 11 during the connection of the teat cup to the animal.
Figure 13:
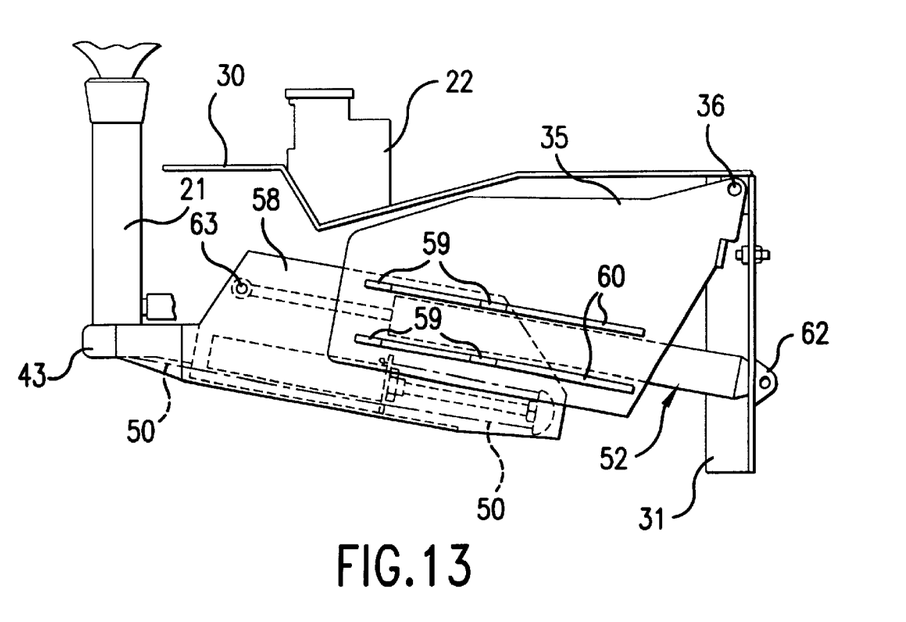

FIG. 3 shows milking compartment 1 including framework 2 and a type of robot arm construction 23 which differs from the one shown in FIGS. 1 and 2. Also in this case, robot arm construction 23 is movable by means of a motor in the longitudinal direction of the milking compartment along a rail 24, making use of rollers 25. Robot arm construction 23 is provided with a carrier, adjustable in height by means of a parallelogram construction and an operating piston and cylinder, which carrier is movable along the aforementioned rail 24 by means of a carrier frame. At the lower side of said carrier is attached a robot arm 26 including a portion 20 which is pivotable in a horizontal plane. By means of operating pistons and cylinders 27 and 28 said pivotable portion 20 is pivotable from a position outside framework 2 to one under the udder of an animal to be milked. The robot arm construction of FIG. 3 has already been described in detail in European Patent Application 519 544 of C. van der Lely, filed Jun. 5, 1992; the description thereof being incorporated by reference to constitute part of the present description of the drawings. The horizontally extending portion 20 of the robot arm is the same in FIGS. 1 to 3 and will now be described with reference to FIGS. 4 to 10. FIGS. 11 to 13 show an alternative embodiment of said horizontally extending robot arm portion 20; this alternative embodiment can, however, also be applied in the robot arm construction of FIGS. 1 and 2 as well as in that of FIG. 3.

Horizontally extending robot arm portion 20 comprises a supporting element 29. This supporting element comprises at least an upper side 30 and a rear side 31. For the purpose of being incorporated in the robot arm of FIGS. 1 and 2, the supporting element is further provided with a side plate, said side plate being fixed to the downwardly extending robot arm portion 19 by means of bolts 32 (FIG. 1). For the purpose of being incorporated in the robot arm of FIG. 3, the supporting element is provided with two lugs 33, through which a rod having a vertical axis of rotation 34 can be inserted, by means of which axis of rotation, horizontally extending robot arm portion 20, under control of the operating piston and cylinder 28, is movable in a horizontal plane under the udder of an animal to be milked.

Figures 4, 6:
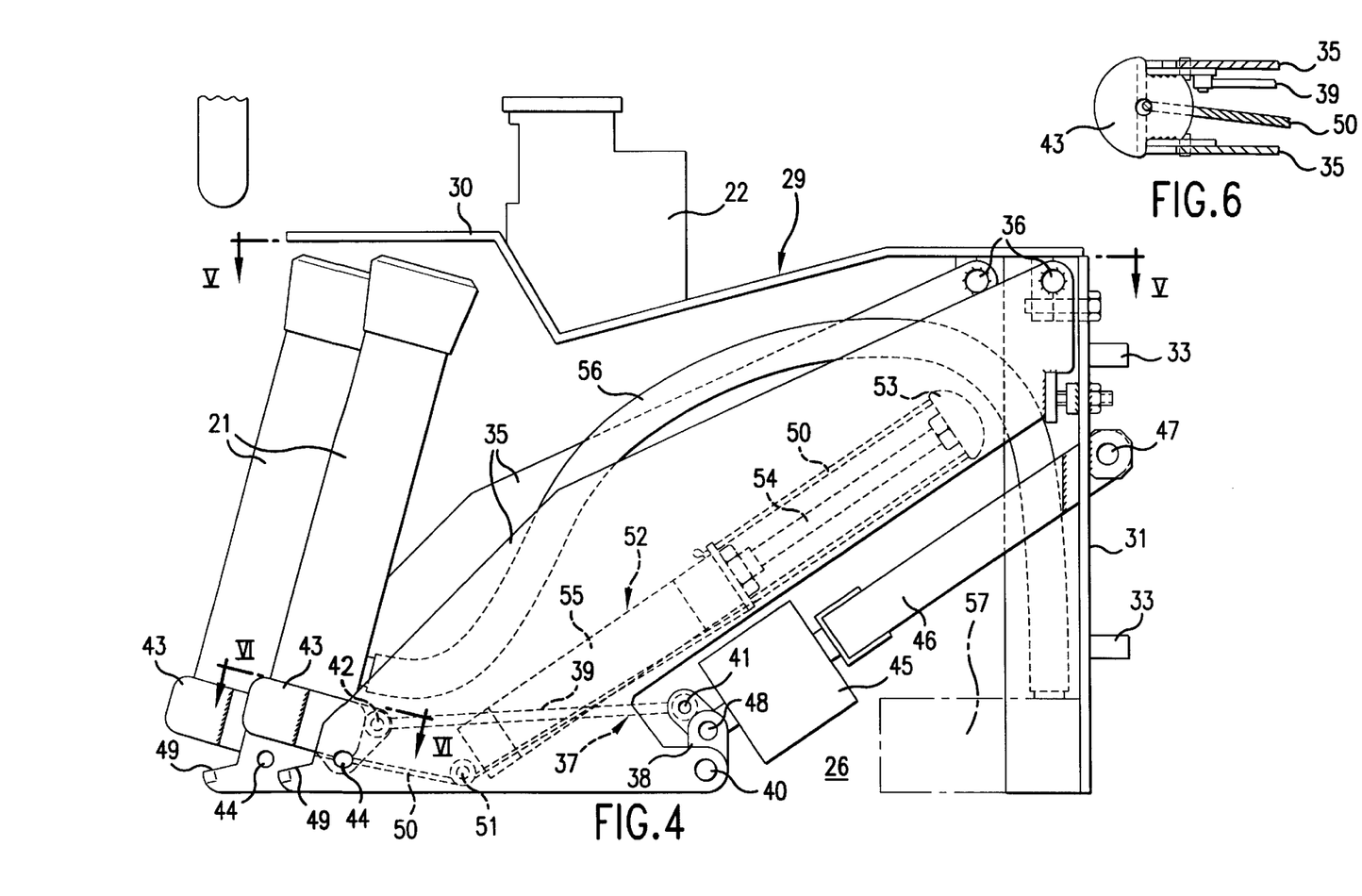
FIG. 4 is a side elevational view of a teat cup carrying a portion of the construction according to the invention.
FIG. 6 shows a detail of part of a housing in the portion of the construction shown in FIGS. 4 and 5.
Figure 5:
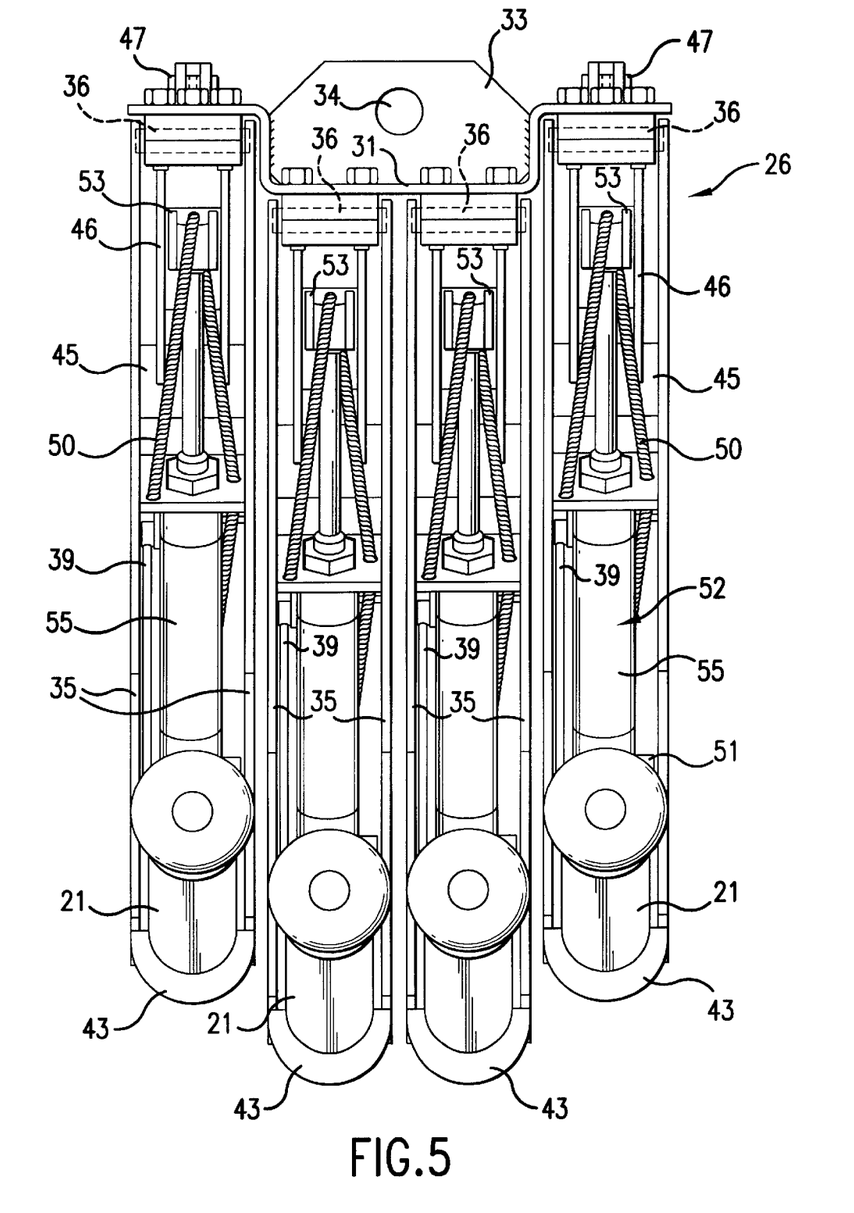
FIG. 5 shows a plan view of the portion of the construction shown in FIG. 4, the supporting and shielding element being omitted, seen in the direction of the arrows V in FIG. 4.
Figure 7:
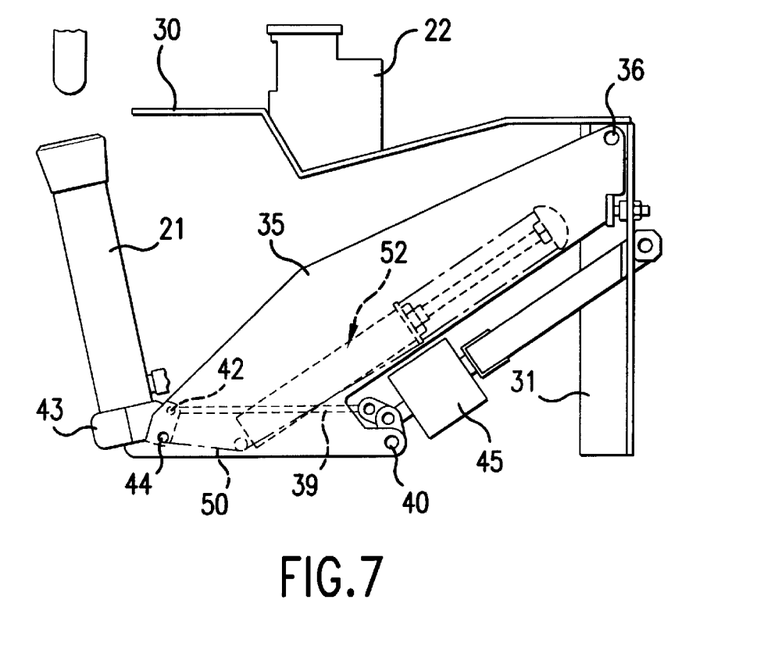
FIGS. 7 to 10 illustrate various positions which are taken by a housing and a teat cup of the portion of the construction shown in FIGS. 4 and 5 during connection to the animal's teats and during milking.
Figure 8:
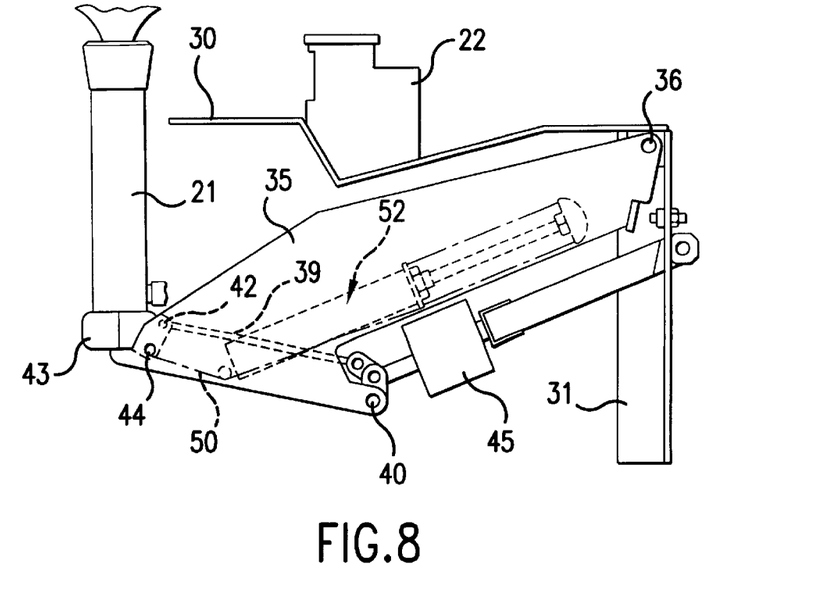
Figure 9:
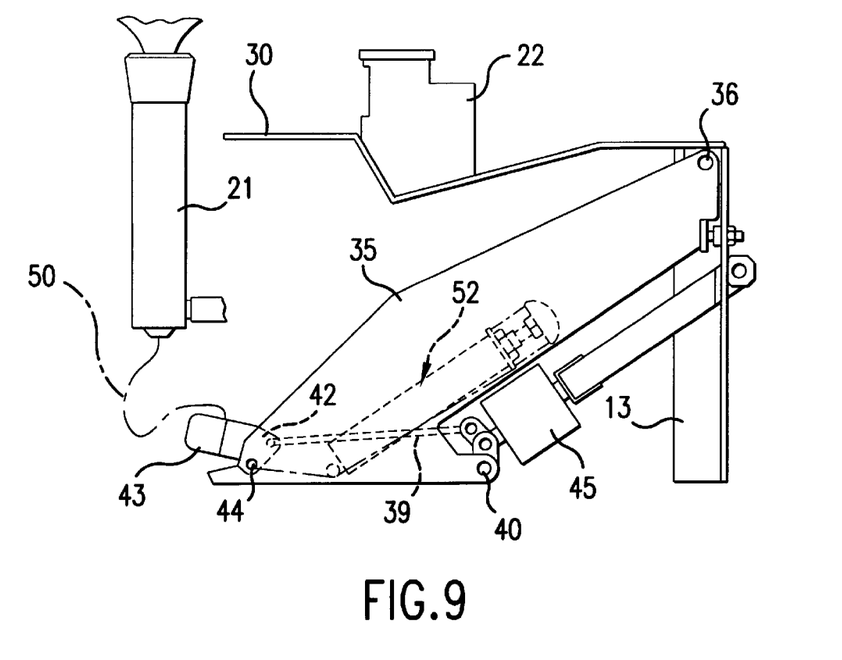

For each teat cup 21 there is provided a housing 35. Each housing is individually hinge-connected, rotatably about a hinge pin 36, to supporting element 29 and consists of two plates between which a teat cup 21 is movably disposed. Each housing 35 is provided with a coupling mechanism 37 consisting of a bell crank 38 and a control lever 39. At one end, bell crank 38 is hinge-connected, rotatably about a hinge pin 40, to a housing 35. At the other end, the bell crank is hinge-connected, rotatably about a hinge pin 41, to control lever 39. From bell crank 38 in the lower part of housing 35, control lever 39 extends forwardly and is hinge-connected at its front end, rotatably about a hinge pin 42, to a carrying shoe 43 for a teat cup 21. Carrying shoe 43 is further hinge-connected, rotatably about a hinge pin 44, to housing 35. In the housing 35 there is provided an operating piston and cylinder mechanism 45 which is connected, at one end, by means of a connecting element 46, rotatably about a hinge pin 47, to supporting element 29, and, at the other end, rotatably about a hinge pin 48, to bell crank 38, more in particular at a point between the two hinge pins 40 and 41. In the configuration of FIG. 4, operating piston and cylinder mechanism 45 is pulled in, so that housing 35 is in its lowest position and the carrying shoe 43 is in a position so that the teat cup carried thereby is supported by carrying shoe 43 in an obliquely rearward direction. In this position, the position of rest, the open upper side of teat cup 21 is shielded by supporting element 29, in particular by upper wall 30 thereof. When operating piston and cylinder mechanism 45 is energized, bell crank 38, rotating about hinge pin 40, is tilted forwardly relative to housing 35, which movement is transferred via the control lever 39 to the carrying shoe, causing the latter to rotate about hinge pin 44 until it gets locked against a stop 49 on housing 35. The teat cup carried by the carrying shoe is thus adjusted into an operative position, that is, a position in which the open upper side of the teat cup is no longer shielded by the supporting element. From this position, which is represented in FIG. 7, the teat cup can be moved upwardly. Such an upward movement is achieved by further energizing operating piston and cylinder mechanism 45, so that the housing, rotating about hinge pin 36, is moved upwardly. This situation is represented in FIG. 8. When, after this upward movement, teat cup 21 is connected to a relevant teat, housing 35 can be moved downwardly, which is achieved by energizing the operating piston and cylinder mechanism 45 in the other direction; see FIG. 9. Although teat cup 21, which remains connected to the teat because of the vacuum in the teat cup, is then released from the carrying shoe 43, there remains a connection between the teat cup 21 and the housing by means of a flexible element 50, such as a cord or cable. Said flexible element 50 extends from the bottom side of a teat cup 21, through a carrying shoe 43 and under a roller 51, in the lower part of housing 35 between the two side plates thereof, to an operating piston and cylinder device 52. During the downward pivoting movement of the housing, said operating piston and cylinder device was released, so that the flexible element, by means of which teat cup 21, which was previously urged against carrying shoe 43, does not hamper the teat cup when it is released from the carrying shoe. To avoid the situation that operating piston and cylinder device 52 is unnecessarily long, flexible element 50 is passed over a guide element 53 at the end of cylinder rod 54 and is subsequently fixed to cylinder housing 55. FIG. 9 shows the position of operating piston and cylinder device 52 after housing 35 has been moved downwardly relative to the supporting element and teat cup 21 has been released from the robot arm. After the milk flow from the relevant udder quarter is completed or is almost completed, the teat cup should be disconnected from the relevant teat. However, it should be first ensured that carrying shoe 43 is positioned so it can easily receive the teat cup disconnected from the teat. To this end, operating piston and cylinder mechanism 45 is energized to such an extent that the carrying shoe is placed in the same position that it has in the operative position, i.e., in the position in which the teat cup is moved upwardly; this situation is represented in FIG. 10. When afterwards the vacuum in the teat cup is removed and operating piston and cylinder device 52 is energized, the falling teat cup is immediately pulled against carrying shoe 43. By subsequently energizing again operating piston and cylinder device 45, the teat cup can again be moved from its operative position into its inoperative position in which the open upper side of the teat cup is shielded. FIG. 4 further shows how a milk tube 56, connected to a teat cup 21 extends through housing 35. From the connection point on teat cup 21 this milk tube extends above operating piston and cylinder device 52 and then passes behind it and downwardly to a connection point on a connecting block 57. Further milk lines which are connected to this connecting block are not shown in the figures. The relatively large loop in the milk tube enables the robot arm to be moved a sufficient distance as required from its respective teat cup when it is received on a teat.

When upon withdrawing a teat cup to the robot arm, operating piston and cylinder device 52 is extended, the milk tube is moved at the same time upwardly and rearwardly by means of the guide element 53, so that the milk tube is always in a controlled position and there is no risk of kinking.

For the purpose of connecting a teat cup via an upward pivoting movement to a relevant teat, the position of the teat relative to the robot arm must be known. To that end, detector 22 is provided. Although a rotating or pivotable laser detector may be used therefor, a pivotable camera or two cameras are preferred which are fixedly arranged at different angles. In order to be able to use the detector during twenty-four hours, consequently also when it is dark at the milking compartment, these cameras should favorably be designed as infrared cameras. Upon using such cameras, by means of picture analysis the contours of a teat are established relative to a specific reference point, such as the middle of the image received by the camera. For example, when a teat is located at a distance a on the right of the vertical diameter through said reference point and, after a pivoting movement of the camera through an angle o at a distance b on the left of this vertical diameter, then for the distance r of the teat relative to the camera it applies that $r.o = a + b$. The angular position y of the teat relative to the position of the camera in a horizontal plane can similarly be determined according to the relation $a = \beta.r$. As a result of the fact that the height at which the robot arm is located upon determining the position of the teat can be known from the position of the operating piston and cylinder member 17, the position of a teat, expressed in piston and cylinder coordinates, can be permanently recorded and kept up to date.

FIGS. 11 to 13 shown an alternative embodiment for the horizontally extending robot arm portion 20. In FIG. 11 the teat cups are in the position of rest, i.e., in the position in which the open upper ends of the teat cups are entirely shielded. Each teat cup 21 is supported by a carrying shoe 43. This carrying shoe 43 is rigidly mounted on a carrier 58 that is shiftable in a relevant housing 35. Said carrier 58 is provided with lugs 59, which are capable of being moved in slots 60 in the two side plates of a housing 35. Housing 35 is furthermore provided with an operating piston and cylinder element 61, which is hinge-connected, rotatably about hinge pins 62 and 63, between supporting element 29 and carrier 58. After this operating piston and cylinder element has been energized, carrier 58 can be moved forwardly from housing 35 until the foremost of lugs 59 encounter the front edges 64 of slots 60; these front edges 64 constitute a stop for carrier 58 that is shiftable in a housing 35. After such a movement, the corresponding teat cup 21 is adjusted into the operative position, i.e., into the position in which it is capable of pivoting upwardly. Said position is represented in FIG. 12. When operating piston and cylinder element 61 is energized further, the relevant housing, with carrier 58 included therein in an extended position, rotates upwardly abott hinge pin 36, in the same manner as shown in the embodiment of FIGS. 4 through 10. This situation is represented in FIG. 13. In a manner similar to the first embodiment, when after an upward movement a teat cup is connected to a teat, a housing, in this case the extended carrier, can be moved downwardly by retracting the piston into the cylinder of element 61. Also in this situation the teat cup remains connected to the robot arm by means of a flexible element 50. Apart from the fact that the operating piston and cylinder device 52 for this flexible element is disposed in carrier 58, the manner in which a teat cup can be pulled against the relevant carrying shoe is the same in this embodiment as in the embodiment of FIGS. 4 to 10.

The milking robot is further provided with weight relieving means, with the aid of which the weight of robot arm construction 3 is compensated in such a manner, that robot arm construction 3 can be manually pivoted by an operating person into a vertical plane, only very little force being required.

In a first embodiment, the weight relieving means comprise a pressure control means with the aid of which, after activating the weight relieving means, the pressure in the operating cylinders in unit 16 and member 17 are adjusted in such a manner that the robot arm construction takes a floating position, whereas, when the robot arm construction is moved in a vertical plane, the floating position of the robot arm construction is preserved in each position.

During movement of the robot arm construction in the vertical plane, the operating piston and cylinder unit 16 and member 17 move in conjunction therewith in an active manner in order to move the robot arm construction using as little force as possible. The pressure control means further comprises an adjustable valve by means of which the floating position of the robot arm construction can be adjusted for situations such as when the weight of the robot arm construction has changed due to alterations.

In a second embodiment, the weight relieving means comprise a spring construction which is disposed between those portions of the robot arm construction and the other portions of the milking robot that are capable of being moved relative to each other in a vertical plane by means of the operating piston and cylinder unit 16 and member 17 of the robot arm construction. In a preferred embodiment in accordance with the invention, the spring construction includes springs wherein their pressure can be adjusted. The above-mentioned weight relieving means in a milking robot have the advantage that, when maintenance work has to be carried out on the robot arm construction, it is possible to keep the robot arm construction in a specific position without supporting same.

Although I have disclosed the preferred embodiments of my invention, it is to be understood that it is capable of other adaptations and modifications within the scope of the following claims:

Having disclosed my invention, what I claim as new and to be secured by letters patent of the United States is:

1. An apparatus for automatically milking animals which comprises a milking robot, a robot arm which carries teat cups, and a shield for said teat cups while in a position of rest on said robot arm, said teat cups having upper openings which are covered by said shield when said teat cups are in said position of rest.

2. An apparatus in accordance with claim 1, wherein said robot arm comprises housings for said teat cups and a supporting element for said housings which is movable under and relative to the udder of an animal being milked said teat cups each being movably disposed in a corresponding said housing.

3. An apparatus in accordance with claim 2, wherein each said housing is hinge-connected to said supporting element.

4. An apparatus in accordance with claim 2, wherein said supporting element comprises shield means for the open upper sides of said teat cups when said teat cups are in an inoperative position prior to and following the milking of said animal.

5. An apparatus in accordance with claim 2, comprising a carrying shoe for each said teat cup, said carrying shoe being hingedly connected to the corresponding said housing.

6. An apparatus in accordance with claim 5, wherein said carrying shoe includes a conically configured recess and the corresponding said teat cup comprises on its lower side a conically configured protrusion which corresponds to said conically configured recess.

7. An apparatus in accordance with claim 5, comprising operating piston and cylinder means which are connected on one end to said supporting element and on the other end are connected to a said carrying shoe in each said housing.

8. An apparatus in accordance with claim 7, comprising stop means for each said carrying shoe in each said housing and a coupling mechanism for moving said teat cup in each said housing, said coupling mechanism being connected to said piston and cylinder means which via said coupling mechanism moves said teat cup in each corresponding said housing from an inoperative position in which the open upper sides of such teat cup are shielded into an operative position in which said upper side of each said corresponding teat cup is no longer shielded, said coupling mechanism being constructed and arranged then further to move the corresponding said teat cup upwardly relative to said housing.

9. An apparatus in accordance with claim 8, wherein said coupling mechanism comprises a bell crank which, at one end, is hingedly connected to said housing for the corresponding said teat cup and at its other end is hingedly connected to a corresponding carrying shoe by a control lever, said operating piston and cylinder means being hingedly connected to said bell crank.

10. An apparatus in accordance with claim 2, comprising a carrier in each said housing, said carrier carrying a teat cup in said housing.

11. An apparatus in accordance with claim 10, comprising a piston and cylinder device in each said housing which interconnects said supporting element and said carrier in the corresponding said housing.

12. An apparatus in accordance with claim 11, wherein said housing comprises stop means for said carrier, whereby when said carrier has been moved against said stop means into an operative position by said piston and cylinder means so that said carrier is bearing against said stop means, a said teat cup in said corresponding housing is moved upwardly.

13. An apparatus in accordance with claim 8, which a computer that controls said operating piston and cylinder means so that upon movement of said piston and cylinder means in one direction said teat cup connected thereto is moved from said inoperative position into said operative position and then upwardly to connect the said corresponding teat cup to the teat of an animal to be milked and further controls said piston and cylinder means so that upon movement in the other direction said teat cup is released from said robot arm.

14. An apparatus in accordance with claim 13, whereupon when said corresponding teat cup has been released from said robot arm, said computer controls said piston and cylinder means to place the corresponding carrying shoe in position to receive the corresponding said teat cup at the conclusion of the milking operation.

15. An apparatus in accordance with claim 2, wherein said housing for each said teat cup carries a piston and cylinder device which is connected to the corresponding said teat cup in such housing by a flexible element, said flexible element being interconnected to the corresponding said teat cup and the corresponding said piston and cylinder device so that when said teat cup is disconnected from an animal's teat, it is retracted by said flexible element and said piston and cylinder device to be firmly received against said robot arm.

16. An apparatus in accordance with claim 15, comprising milk tubes, each said teat cup being connected to a corresponding said milk tube, said milk tube extending from said corresponding teat cup over said piston and cylinder device within the corresponding said housing and therebehind in such corresponding housing.

17. An apparatus in accordance with claim 16, comprising housing means for accommodating the rearward movement of said milk tube in each said housing upon retracting the corresponding said teat cup to against said robot arm.

18. An apparatus in accordance with claim 17, wherein said housing means comprises a guide element connected to said piston and cylinder device in each said housing.

19. An apparatus in accordance with claim 1, which further comprises a detector on said robot arm for determining the position of the teats of an animal to be milked.

20. An apparatus in accordance with claim 19, wherein said robot arm comprises a supporting element which includes said shield, said detector being disposed on said supporting element.

21. An apparatus in accordance with claim 19, wherein said detector comprises two cameras, each of said cameras being fixedly arranged on said supporting element and being pointed in different directions which are at an angle to each other.

22. An apparatus in accordance with claim 19, wherein said detector comprises a pivotal camera.

23. An apparatus in accordance with claim 19, wherein said detector comprises an infrared camera.

24. A method of automatically milking animals by a milking apparatus which is provided with a milking robot that includes a robot arm which carries teat cups, the method comprising first retaining said teat cups in an inoperative position, in which the open upper side of said teat cup is shielded by a robot arm portion, moving said teat cups into an operative position wherein the upper open sides of said teat cups are no longer shielded by said robot arm portion, and subsequently moving said teat cups upwardly and connecting said teat cups to the teats of the animal to be milked.

25. A method in accordance with claim 24, wherein each said teat cup is supported from a housing, each said teat cup being moved upwardly by moving the corresponding said housing for such teat cup upwardly in said robot arm.

26. A method in accordance with claim 25, wherein after each said teat cup is connected to the teat of the animal to be milked, each housing for each said teat cup is moved downwardly in said robot arm, each said teat cup then being connected to its corresponding said housing only by a flexible element.

27. A method in accordance with claim 26, wherein each said housing includes a carrying shoe for the corresponding said teat cup, each said shoe being adjusted to receive said corresponding teat cup when the corresponding said housing has been moved downwardly after the corresponding said teat cup has been connected to the teat of an animal to be milked.

28. A method in accordance with claim 24, comprising the further steps of disconnecting each said teat cup when the udder quarter of the animal being milked has almost been milked out, pulling said disconnected teat cup against a carrying shoe in a housing for said teat cup in said robot arm and returning such teat cup so that it is shielded by said robot arm portion in its inoperative position.

* * * * *